(12) United States Patent
Agarwal et al.

(10) Patent No.: US 12,284,561 B2
(45) Date of Patent: Apr. 22, 2025

(54) METHOD AND UE FOR 5G DATA SESSION SWITCHING

(71) Applicant: Samsung Electronics Co., Ltd., Suwon-si (KR)

(72) Inventors: Aman Agarwal, Bangalore (IN); Kailash Kumar Jha, Bangalore (IN); Nishant, Bangalore (IN); Avneesh Tiwari, Bangalore (IN); Samiran Bhowmik, Bangalore (IN); Nitesh Pushpak Shah, Bangalore (IN); Vishwajeet, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 17/733,027

(22) Filed: Apr. 29, 2022

(65) Prior Publication Data

US 2022/0353774 A1 Nov. 3, 2022

Related U.S. Application Data

(63) Continuation of application No. PCT/KR2022/006191, filed on Apr. 29, 2022.

(51) Int. Cl.
*H04W 36/08* (2009.01)
*H04W 36/00* (2009.01)
(Continued)

(52) U.S. Cl.
CPC ..... *H04W 36/08* (2013.01); *H04W 36/00698* (2023.05); *H04W 36/142* (2023.05); *H04W 36/304* (2023.05); *H04W 88/06* (2013.01)

(58) Field of Classification Search
CPC ....... H04W 36/0069; H04W 36/00698; H04W 36/08; H04W 36/142; H04W 36/30;
(Continued)

(56) References Cited

U.S. PATENT DOCUMENTS

| 9,282,495 B1 | 3/2016 | Mckeeman et al. |
| 10,231,117 B2 * | 3/2019 | Sahu .................. H04L 65/1016 |

(Continued)

FOREIGN PATENT DOCUMENTS

| CN | 105208205 A | 12/2015 |
| CN | 112188571 A | 1/2021 |

(Continued)

OTHER PUBLICATIONS

Yavuz et al., "Enhancements for measurement triggering in Non-Terrestrial Networks", Telefonaktiebolaget LM Ericsson, U.S. Appl. No. 63/104,324 20201022, Total pp. 50 (Year: 2020).*

(Continued)

*Primary Examiner* — Shah M Rahman
(74) *Attorney, Agent, or Firm* — Jefferson IP Law, LLP

(57) ABSTRACT

A method for a data session switching by a User Equipment (UE) is provided. The method includes monitoring network broadcasted parameters of a second Subscriber Identity Module (SIM) of the UE while performing a Fifth Generation Cellular Network (5G) data session over a first SIM of the UE, where the first SIM is configured for a Default Data Service (DDS), detecting that a trigger criterion is met for the 5G data session switching to the second SIM based on the network broadcasted parameters, and in response to the trigger criterion being met, configuring the second SIM for the DDS for continuing the 5G data session over the second SIM.

20 Claims, 6 Drawing Sheets

(51) Int. Cl.
*H04W 36/14* (2009.01)
*H04W 36/30* (2009.01)
*H04W 88/06* (2009.01)

(58) Field of Classification Search
CPC ... H04W 36/304; H04W 76/15; H04W 8/183; H04W 88/02; H04W 88/06
See application file for complete search history.

(56) References Cited

U.S. PATENT DOCUMENTS

| | | | |
|---|---|---|---|
| 2017/0280380 A1 | 9/2017 | Gundu et al. | |
| 2018/0132289 A1* | 5/2018 | Zhao | H04W 76/16 |
| 2020/0068647 A1* | 2/2020 | Jha | H04W 76/15 |
| 2020/0077325 A1 | 3/2020 | Jangid et al. | |
| 2020/0314629 A1 | 10/2020 | Kreishan | |
| 2020/0359196 A1* | 11/2020 | Balasubramaniam | H04W 72/30 |
| 2020/0374791 A1 | 11/2020 | Fulzele et al. | |
| 2020/0383152 A1 | 12/2020 | Walia et al. | |
| 2020/0389558 A1 | 12/2020 | Li et al. | |
| 2021/0029604 A1 | 1/2021 | Wang et al. | |
| 2021/0112399 A1* | 4/2021 | Gopal | H04L 5/0048 |
| 2022/0078877 A1 | 3/2022 | Lee et al. | |
| 2022/0110177 A1* | 4/2022 | Choksi | H04M 15/41 |
| 2022/0286839 A1* | 9/2022 | Zhao | H04W 76/16 |
| 2022/0295343 A1* | 9/2022 | Pefkianakis | H04W 36/22 |
| 2022/0408328 A1* | 12/2022 | Adjakple | H04W 36/0061 |
| 2023/0047213 A1* | 2/2023 | Chen | H04W 36/14 |
| 2023/0118286 A1* | 4/2023 | Mao | H04W 12/45 455/558 |
| 2023/0292396 A1* | 9/2023 | Vyas | H04W 36/0058 |
| 2023/0397032 A1* | 12/2023 | Yavuz | H04B 7/1853 |
| 2024/0022974 A1* | 1/2024 | Zhang | H04W 36/1443 |

FOREIGN PATENT DOCUMENTS

| | | |
|---|---|---|
| KR | 10-2020-0011353 A | 2/2020 |
| WO | 2015/026633 A1 | 2/2015 |
| WO | WO-2022099591 A1 * | 5/2022 |

OTHER PUBLICATIONS

Extended European Search Report dated May 22, 2024, issued in European Patent Application No. 22796214.9.

Indian Office Action dated Dec. 26, 2022, issued in Indian Patent Application No. 202141019973.

International Search Report dated Sep. 15, 2022, issued in an International Application No. PCT/KR2022/006191.

* cited by examiner

METHOD AND UE FOR 5G DATA SESSION SWITCHING

CROSS-REFERENCE TO RELATED APPLICATION(S)

This application is a continuation application, claiming priority under § 365(c), of an International application No. PCT/KR2022/006191, filed on Apr. 29, 2022, which is based on and claims the benefit of an Indian Provisional patent application number 202141019973, filed on Apr. 30, 2021, in the Indian Intellectual Property Office, and of an Indian Complete patent application number 202141019973, filed on Apr. 20, 2022, in the Indian Intellectual Property Office, the disclosure of each of which is incorporated by reference in herein in its entirety.

FIELD OF INVENTION

The disclosure relates to wireless communication. More particularly, the disclosure relates to a method and a User Equipment (UE) for Fifth Generation Cellular Network (5G) data session switching.

BACKGROUND

Generally, a 5G data service will be active only in single Subscriber Identity Module (SIM) of a UE at a time even if the UE supports Dual SIM Dual Standby (DSDS). If a Default Data Service/Subscription (DDS) is activated on a first SIM of the UE, then the 5G data service can access only through the first SIM. The UE loses the 5G data service on the first SIM due to reasons such as Secondary Cell Group (SCG) failure, out of 5G service, etc, leads to data connection over for Fourth Generation Cellular Network (4G) instead of the 5G on the first SIM. The user would be able to use the 5G data service when the first SIM camps again for the 5G data service. The user will not be able to access the 5G data service in that particular area even if a second SIM of the UE is able to provide the 5G data service.

Consider, the DDS is active on the first SIM based on a network broadcast and device capability and the second SIM can provide better 5G data service, then the user still gets lower data speed on the first SIM than the UE is capable of getting via the second SIM. Consider, the DDS is active on the first SIM with a network architecture option 4 (i.e. New Radio (NR)-Evolved Universal Terrestrial Radio Access Network (EUTRAN) Dual Connectivity (NE-DC)) and based on the network broadcast and device capability, and the second SIM can provide better 5G EUTRAN-NR Dual Connectivity (EN-DC) data service, then the user still gets the lower data speed on the first SIM via a 5G NE-DC service than the UE is capable of getting via the second SIM via the 5G EN-DC service.

Consider, the DDS is active on the first SIM during handover or initial cell selection or cell reselection or redirection, etc., and the UE selects a cell on the first SIM which provides either 4G services or the 5G data services with comparatively lower data speed in a same area, whereas the second SIM is able to provide better 5G data services. Then the user will be using data service on the first SIM either on the 4G or on the 5G with lower data speed instead of getting better 5G data speed from the second SIM. Alternatively, the user needs to manually switch the DDS to the second SIM and check whether the second SIM is capable to provide the 5G data service over the second SIM, which needs a manual effort, hence degrades a user experience. Thus, it is desired to provide a useful alternative for automatically switching the DDS between multiple SIMs of the UE for providing the 5G data service with better data speed.

The above information is presented as background information only to assist with an understanding of the disclosure. No determination has been made, and no assertion is made, as to whether any of the above might be applicable as prior art with regard to the disclosure.

OBJECT OF INVENTION

Aspects of the disclosure are to address at least the above-mentioned problems and/or disadvantages and to provide at least the advantages described below. Accordingly, aspect of the disclosure is to provide a method and a dual sim dual standby UE for 5G data session switching to provide better 5G data services at all times. When poor 5G data services are receiving at a DDS enabled SIM of the UE or if the 5G data services are not receiving at the DDS enabled SIM even being present in a better 5G data serviceable area of other SIM of the UE, then the UE dynamically switches the DDS to the other SIM and continues to provide the 5G data services to the user via the other SIM without any interruption, which enhances user experience.

Another aspect of the disclosure is to use network broadcast parameters such as a bandListENDC, a plmn-InfoList, a nr-BandList and an upperlayerindication to determine for the 5G data session switching from the DDS enabled SIM to the other SIM.

Additional aspects will be set forth in part in the description which follows and, in part, will be apparent from the description, or may be learned by practice of the presented embodiments.

SUMMARY

In accordance with an aspect of the disclosure, a method for a data session switching by a UE is provided. The method includes monitoring, by the UE, network broadcasted parameters of a second Subscriber Identity Module (SIM) of the UE while performing a 5G data session over a first SIM of the UE, where the first SIM is configured for a Default Data Service (DDS), detecting, by the UE, that a trigger criterion is met for the 5G data session switching to the second SIM based on the network broadcasted parameters, and in response to the trigger criterion being met, configuring, by the UE, the second SIM for the DDS for continuing the 5G data session over the second SIM, wherein the second SIM of the UE includes a bandListENDC, a plmn-InfoList, a nr-BandList, and an upperlayerindication.

In an embodiment, where the UE obtains the network broadcasted parameters from a System Information Block Type-1 (SIB-1), or a System Information Block Type-2 (SIB-2), or a System Information Block Type-26a (SIB-26a).

In an embodiment, where detecting, by the UE, that the trigger criterion meets for the 5G data session switching to the second SIM based on the network broadcasted parameters, includes identifying, by the UE, a poor network performance of the first SIM, estimating, by the UE, that the second SIM is capable to continue the 5G data session with an optimal network performance based on the network broadcasted parameters, and detecting, by the UE, that the trigger criterion for the 5G data session switching meets upon estimating that the second SIM is capable to continue the 5G data session with the optimal network performance.

In an embodiment, where identifying, by the UE, the poor network performance of the first SIM, includes detecting, by the UE, at least one of a Secondary Cell Group (SCG) failure or an out of 5G service on the first SIM, a lower data speed on the first SIM, and camping or selecting or reselecting or redirecting or handing-over to a cell on the first SIM that provides poor 5G throughput or services or doesn't provide 5G throughput or services.

In an embodiment, where estimating, by the UE, that the second SIM is capable to continue the 5G data session with the optimal network performance based on the network broadcasted parameters, includes identifying, by the UE, candidate EN-DC values/combinations that is common among EN-DC values/combinations broadcasted by a network of the second SIM and EN-DC values/combinations supported on the second SIM of the UE based on the network broadcasted parameters, estimating, by the UE, a throughput for the candidate EN-DC values/combinations of the second SIM based on a network deployment parameter, a signal parameter, and a device capability, determining, by the UE, that the estimated throughput of the second SIM meets a threshold throughput, where the threshold throughput is larger than a throughput for the first SIM, and determining, by the UE, that the second SIM is capable to continue the 5G data session with the optimal network performance.

In an embodiment, where the network deployment parameter including an operator bandwidth and operator deployment of different network architecture options for the Second SIM, the signal parameter including a Reference Signal Received Power (RSRP), a Reference Signal Received Quality (RSRQ), a Signal to Interference plus Noise Ratio (SINR), a Channel Quality Indicator (CQI) and the device capability including a support of the UE for Second SIM for EN-DC, Carrier Aggregation (CA), a Multiple Input, Multiple Output (MIMO), a number of layers supported for corresponding 4G/5G band.

In an embodiment, where detecting, by the UE, that the trigger criterion for the 5G data session switching meets upon estimating that the second SIM is capable to continue the 5G data session with the optimal network performance, includes detecting, by the UE, that a fee for data consumption from the second SIM is accepted by a user, a mobile data plan of the second SIM is active, and mobile data for the second SIM is available, upon estimating that the second SIM is capable to continue the 5G data session with the optimal network performance, receiving, by the UE, a user consent for the 5G data session switching, and detecting, by the UE, that the trigger criterion for the 5G data session switching is met.

In an embodiment, where configuring, by the UE, the second SIM for the DDS for continuing the 5G data session over the second SIM, includes determining, by the UE, whether the second SIM is operating in a device cellular mode with 5G mode or an alternative cellular mode upon detecting that the trigger criterion is met, performing, by the UE, one of in response to determining that the second SIM is operating in the alternative cellular mode, switching the second SIM to operate on the device cellular mode with 5G mode, and configuring the second SIM for the DDS for continuing the 5G data session over the second SIM, and in response to determining that the second SIM is operating in the device cellular mode with 5G mode, configuring the second SIM for the DDS for continuing the 5G data session over the second SIM.

In an embodiment, where configuring, by the UE, the second SIM for the DDS for continuing the 5G data session over the second SIM, includes initiating, by the UE, a timer upon detecting that the trigger criterion is met, determining, by the UE, whether the trigger criterion meets till an expiry of the timer, and configuring, by the UE, the second SIM for the DDS for continuing the 5G data session over the second SIM after the expiry of the timer.

In an embodiment, where configuring, by the UE, the second SIM for the DDS for continuing the 5G data session over the second SIM, includes, one of, automatically configuring, by the UE, the second SIM for the DDS for continuing the 5G data session over the second SIM upon detecting that the trigger criterion is met and configuring, by the UE, the second SIM for the DDS for continuing the 5G data session over the second SIM upon detecting the trigger criterion based on the user consent.

In accordance with another aspect of the disclosure, an electronic device for UE for performing a data session switching is provided. The electronic device includes a 5G switching engine, a memory, a processor, a first SIM and a second SIM, where the 5G switching engine is coupled to the memory and the processor. The processor is configured to monitor the network broadcasted parameters of the second SIM of the UE while performing a 5G data session over the first SIM of the UE, where the first SIM is configured for the DDS, detect that the trigger criterion is met for the 5G data session switching to the second SIM based on the network broadcasted parameters, and in response to the trigger criterion being met, configure the second SIM for the DDS for continuing the 5G data session over the second SIM, wherein the second SIM of the UE includes a bandListENDC, a plmn-InfoList, a nr-BandList, and an upperlayerindication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
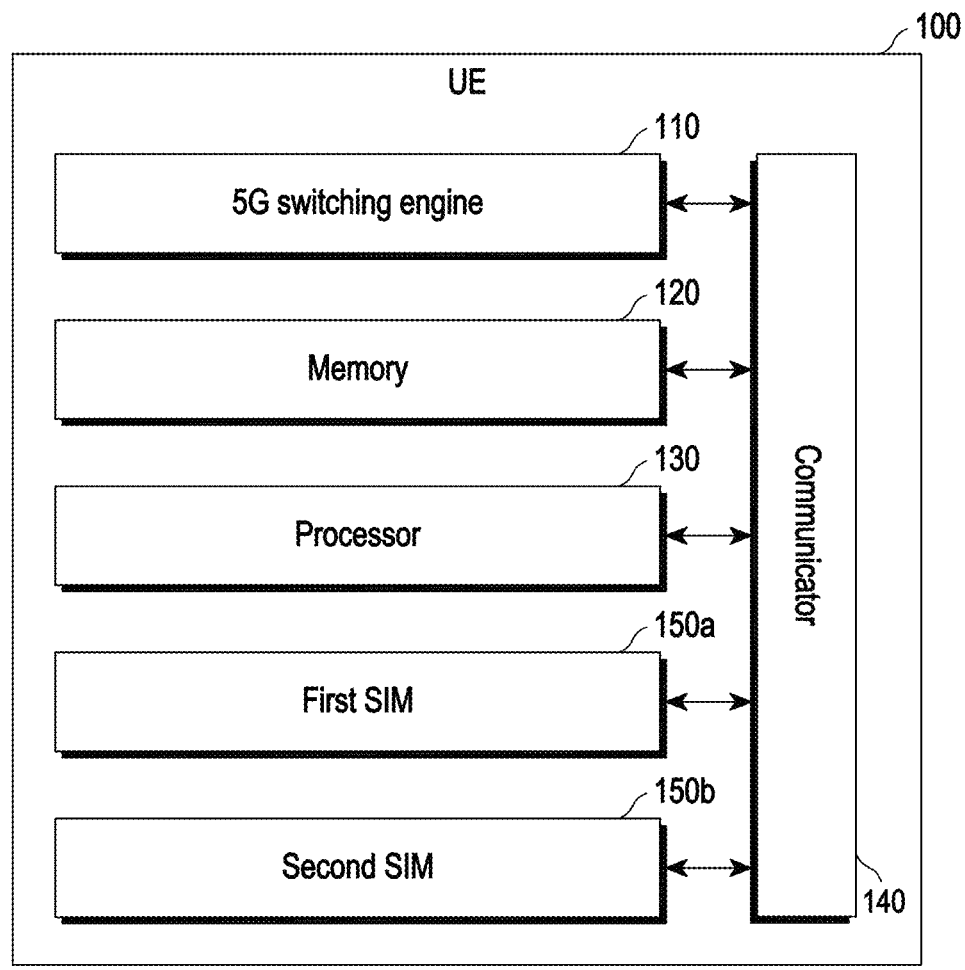
FIG. 1 is a block diagram of a UE for 5G data session switching, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "SIM 1" and "first SIM" are used interchangeably and mean the same, the terms "SIM 2" and "second SIM" are used interchangeably and mean the same.

Accordingly, the embodiments herein provide a method for 5G data session switching by a UE. The method includes monitoring, by the UE, network broadcasted parameters of a second Subscriber Identity Module (SIM) of the UE includes a bandListENDC, a plmn-InfoList, a nr-BandList, and an upperlayerindication while performing a 5G data session over a first SIM of the UE, where the first SIM is configured for a Default Data Service (DDS). The method includes detecting, by the UE, that a trigger criterion meets for the 5G data session switching to the second SIM based on the network broadcasted parameters. The method includes configuring, by the UE, the second SIM for the DDS for continuing the 5G data session over the second SIM.

Accordingly, the embodiments herein provide the UE for 5G data session switching. The electronic device includes a 5G switching engine, a memory, a processor, a first SIM and a second SIM, where the 5G switching engine is coupled to the memory and the processor. The 5G switching engine is configured for monitoring the network broadcasted parameters of the second SIM of the UE includes the bandListENDC, the plmn-InfoList, the nr-BandList, and the upperlayerindication while performing a 5G data session over the first SIM of the UE, where the first SIM is configured for the DDS. The 5G switching engine is configured for detecting that the trigger criterion meets for the 5G data session switching to the second SIM based on the network broadcasted parameters. The 5G switching engine is configured for configuring the second SIM for the DDS for continuing the 5G data session over the second SIM.

The proposed method allows the dual sim dual standby UE to provide better 5G data services at all times in scenarios where better 5G data services aren't available on a DDS enabled SIM of the UE due to poor or no 5G data service on the DDS enabled SIM and other SIM of the UE is able to provide better 5G data services in same area at same time. Upon detecting the poor or no 5G data service on the DDS enabled SIM, the UE dynamically switches the DDS or both the DDS and 5G mode to the other SIM for providing better 5G data services at all times to a user.

When the UE is camped on a 4G/5G cell, then the UE reads a System Information Block Type-1 (SIB-1), a System Information Block Type-2 (SIB-2) and a System Information Block Type-26a (SIB-26a) as broadcasted by the 4G/5G cell for identifying the parameters includes the bandListENDC, the plmn-InfoList, the nr-BandList and the upperlayerindication. Based on the values of the parameters, the UE identifies candidate EN-DC values/combinations which are common among EN-DC values broadcasted by the 4G/5G cell and the EN-DC values/combinations supported by the UE as per hardware/program/chipset capability of the UE such as EN-DC support, 5G band/frequency supported, 4G band/frequency supported etc. All the common EN-DC values/combinations are supported by both the UE and the 4G/5G cell would be candidate for throughput determination.

For throughput determination, the UE estimates the theoretical throughput for the candidate EN-DC values/combinations based on network deployment parameters such as an operator bandwidth or operator deployment of different network architecture options, cell/signal parameters such as a Reference Signal Received Power (RSRP), a Reference Signal Received Quality (RSRQ), a Signal to Interference plus Noise Ratio (SINR), a Channel Quality Indicator (CQI) etc., and device capabilities such as support of the UE for ENDC, Carrier Aggregation (CA), Multiple Input, Multiple Output (MIMO), number of layers supported for corresponding 4G/5G band from program/hardware/chipset perspective, etc. The UE chooses the highest theoretical throughput results to determine whether dynamic switching of the 5G is required or not to the other SIM.

The UE identifies if the trigger criterion is met or not on the DDS enabled SIM before dynamic switching could take place. The trigger criterion meets if the 5G data services are lost (due to SCG failure or out of 5G service) on the DDS enabled SIM, else if the 5G data speeds or services are poor due to deteriorating network or cell or signal conditions or due to exhausting a mobile data plan on the DDS enabled SIM or due to reaching a data limit restriction on the DDS enabled SIM or due to insufficient balance or data balance on the DDS enabled SIM or due to Fair Usage Policy (FUP) data exhausted or due to other poor network parameters on the DDS enabled SIM, else if the 5G (NE-DC) data speeds or services are poor due to limited available band combinations on the DDS enabled SIM, else the DDS enabled SIM camps/selects/reselects/redirected/handed over onto a cell with poor 5G throughput or services or no 5G throughput or services.

When the UE identifies that the trigger criterion is met and other SIM is able to provide better 5G data throughput or services, then the UE either switches the DDS to the other SIM from the DDS enabled SIM if the other SIM was already on a network mode/cellular mode including 5G mode or switches both DDS and the UE-supporting network mode/cellular mode including 5G mode to the other SIM from the DDS enabled SIM if the other SIM was on lower cellular modes/network modes (e.g. 4G mode, 3G mode etc.) other than the 5G mode. The 5G data session switching could happen either automatically based on one-time consent from the user or regulated through some settings option or a notification can be sent to the user to switch the DDS and/or 5G mode to the other SIM.

Conventional methods allow devices to initially camp on a 5G cell and further determines a quality/throughput of 5G data services based on actual camping status. Unlike the conventional methods, the proposed method allows the UE to determine the quality/throughput of the 5G data services even before camping on the 5G cellular network and automatically switch for better 5G data services.

When poor 5G data services are receiving at a DDS enabled SIM of the UE or if the 5G data services are not receiving at the DDS enabled SIM even being present in a better 5G data serviceable area of other SIM of the UE, then the UE dynamically switches the DDS to the other SIM and continues to provide the 5G data services to the user via the other SIM without any interruption, which enhances user experience.

Referring now to the drawings, and more particularly to FIGS. 1 through 6, there are shown preferred embodiments.

FIG. 1 is a block diagram of a UE (100) for 5G data session switching, according to an embodiment of the disclosure.

Examples of the UE (100) include, but are not limited to a smailphone, a tablet computer, a Personal Digital Assistance (PDA), a desktop computer, an Internet of Things (IoT), a wearable device, etc. Referring to FIG. 1, the UE (100) includes a 5G data session switching engine (110), a memory (120), a processor (130), a communicator (140), a first SIM (150a), and at least one second SIM (150b), where the UE (100) supports Dual SIM Dual Standby (DSDS). The 5G data session switching engine (110) is implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The 5G data session switching engine (110) monitors network broadcasted parameters of the second SIM of the UE (100) while performing a 5G data session over the first SIM (150a) of the UE (100), where the first SIM (150a) is configured for a Default Data Service (DDS). The network broadcasted parameters of the second SIM of the UE (100) includes a bandListENDC, a plmn-InfoList, a nr-BandList, and an upperlayerindication. In an embodiment, the 5G data session switching engine (110) obtains the network broadcasted parameters from a System Information Block Type-1 (SIB-1), or a System Information Block Type-2 (SIB-2) or a System Information Block Type-26a (SIB-26a). The 5G data session switching engine (110) detects that a trigger criterion meets for the 5G data session switching to the second SIM (150b) based on the network broadcasted parameters. The 5G data session switching engine (110) configures the second SIM (150b) for the DDS for continuing the 5G data session over the second SIM (150b).

In an embodiment, the 5G data session switching engine (110) identifies a poor network performance of the first SIM (150a). Further, the 5G data session switching engine (110) estimates that the second SIM (150b) is capable to continue the 5G data session with an optimal network performance based on the network broadcasted parameters. Further, the 5G data session switching engine (110) detects that the trigger criterion for the 5G data session switching meets upon estimating that the second SIM (150b) is capable to continue the 5G data session with the optimal network performance.

In an embodiment, the 5G data session switching engine (110) identifies the poor network performance of the first SIM (150a) upon detecting a Secondary Cell Group (SCG) failure or an out of 5G service on the first SIM (150a) or a lower data speed on the first SIM (150a) or camping or selecting or reselecting or redirecting or handing-over to a cell on the first SIM (150a) that provides poor throughput/services or does not provide the 5G throughput/services In an embodiment, the 5G data session switching engine (110) identifies candidate EN-DC values/combinations that is common among EN-DC values/combinations broadcasted by a network of the second SIM (150b) and EN-DC values/combinations supported by the UE (100) on the second SIM (150b) based on the network broadcasted parameters. Further, the 5G data session switching engine (110) estimates a throughput for the candidate EN-DC values/combinations of the second SIM (150b) based on a network deployment parameter, a signal parameter, and a device capability. Examples of the network deployment parameter are, but not limited to an operator bandwidth and operator deployment of different network architecture options for the second SIM (150b). Examples of the signal parameter are, but not limited to a Reference Signal Received Power (RSRP), a Reference Signal Received Quality (RSRQ), a Channel Quality Indicator (CQI) and a Signal to Interference plus Noise Ratio (SINR). Examples of the device capability are, but not limited to support of the UE (100) for the EN-DC, a Carrier Aggregation (CA), a Multiple Input, Multiple Output (MIMO), a number of layers supported for corresponding 4G/5G band. Further, the 5G data session switching engine (110) determines that the estimated throughput of the second SIM (150*b*) meets a threshold throughput, where the threshold throughput is larger than a throughput for the first SIM (150*a*). Further, the 5G data session switching engine (110) determines that the second SIM (150*b*) is capable to continue the 5G data session with the optimal network performance upon determining that the estimated throughput of the second SIM (150*b*) meets the threshold throughput.

In an embodiment, the 5G data session switching engine (110) detects that a fee for data consumption from the second SIM (150*b*) is accepted by a user, a mobile data plan of the second SIM (150*b*) is active, and mobile data for the second SIM (150*b*) is available, upon estimating that the second SIM (150*b*) is capable to continue the 5G data session with the optimal network performance. Further, the 5G data session switching engine (110) receives a user consent for the 5G data session switching. Further, the 5G data session switching engine (110) detects that the trigger criterion for the 5G data session switching is met.

In an embodiment, the 5G data session switching engine (110) determines whether the second SIM (150*b*) is operating in a device cellular mode with 5G mode or an alternative cellular mode upon detecting that the trigger criterion is met. In response to determining that the second SIM (150*b*) is operating in the alternative cellular mode, the 5G data session switching engine (110) switches the second SIM (150*b*) to operate on the device cellular mode with 5G mode, and configures the second SIM (150*b*) for the DDS for continuing the 5G data session over the second SIM (150*b*). In response to determining that the second SIM (150*b*) is operating in the device cellular mode with 5G mode, the 5G data session switching engine (110) configures the second SIM (150*b*) for the DDS for continuing the 5G data session over the second SIM (150*b*).

In another embodiment, the 5G data session switching engine (110) initiates a timer upon detecting that the trigger criterion is met. Further, the 5G data session switching engine (110) determines whether the trigger criterion meets till an expiry of the timer. Further, the 5G data session switching engine (110) configures the second SIM (150*b*) for the DDS for continuing the 5G data session over the second SIM (150*b*) after the expiry of the timer.

In another embodiment, the 5G data session switching engine (110) automatically configures the second SIM (150*b*) for the DDS for continuing the 5G data session over the second SIM (150*b*) upon detecting that the trigger criterion is met. In another embodiment, the 5G data session switching engine (110) configures the second SIM (150*b*) for the DDS for continuing the 5G data session over the second SIM (150*b*) upon detecting the trigger criterion is met based on a user consent.

As a part of adding upper layer enhancements in Release 15 and Release 16 3GPP specification by RAN2 (i.e. 3GPP TSG RAN WG2) group, the network broadcasted parameters includes the bandListENDC, the plmn-InfoList, the nr-BandList and the upperlayerindication are introduced in Change Request (CR) R2-2006081 for better 5G reporting to upper layers and better determination of EUTRA-NR Dual Connectivity (EN-DC) supported by the serving network. The UE (100) is ENDC capable using the network broadcasted parameters to know which all 5G bands can be added as SCG in ENDC operation with a cell.

The SIB-2 is broadcasted by the network when UE (100) is camped on a 4G cell. The SIB2 indicates the upperlayerindication to the UE (100). If the upperlayerindication was set to TRUE, then UE (100) determines that the network supports 5G (EN-DC) in that area. If the upperlayerindication was set to FALSE or is not available, then UE (100) determines that the network doesn't support the 5G (EN-DC) in that area. The UE (100) reports the 5G data service to User Interface (UI/UX) based on the value of the upperlayerindication. However, there can be different 5G bands supported by the network (e.g. N1, N2, N3, etc.) for EN-DC services, which was not broadcasted by the network earlier. If UE capability doesn't include any of the 5G bands for which the network supports the EN-DC service in that area, then the UE (100) may mistakenly update the User Interface (UI/UX) that the 5G data service is available even though the UE (100) can't get the 5G data service in that area. Conventional systems use the network broadcasted parameters for determination of 5G services availability when camped on the 4G cell. This is an incomplete way of determination of 5G (EN-DC) services availability when camped to the 4G cell.

The SIB-2 is broadcasted by the network when UE (100) is camped on a 4G cell. The SIB2 indicates the upperlayerindication (ULI) and the plmn-InfoList to the UE (100). The plmn-InfoList defines the PLMN(s) supported by the 4G cell in that area and the upperlayerindication was indicated for each PLMN(s) in the plmn-InfoList separately. For example, if the 4G cell supports PLMN(s): PLMN1, PLMN2, PLMN3 etc. then the upperlayerindication was indicated for each PLMN(s) as PLMN1: ULI (1), PLMN2: ULI(0), PLMN3: ULI(1), which means that PLMN2 doesn't support 5G data services.

Additionally, the SIB-26a was broadcasted with the parameters includes the bandListENDC, the plmn-InfoList, and the nr-BandList by the 4G cell to the UE (100). The bandListENDC indicates a list of 5G bands which can be configured as SCG in EN-DC operation with the serving cell. The nr-Bandlist indicates a list of 5G bands from the bandListENDC which can be supported by the current 4G cell. The combination of the bandListENDC, the plmn-InfoList and the nr-BandList defined the 5G bands on which EN-DC operation is supported by the 4G cell. For example, if the 4G cell supports the EN-DC operation on N1 and N3, only N1 and N3 bit in the nr-Bandlist would be set to 1 and N2 would be set to 0 if bandListENDC contains N1, N2 and N3. The UE (100) uses the combination of the bandListENDC, the plmn-InfoList and the nr-BandList to identify all the 5G bands on which the EN-DC operation is supported by the 4G cell. The UE (100) identifies the EN-DC values/combinations which are commonly supported by both the 4G cell and the UE (100) based on UE's capability. The UE (100) accurately determines the 5G availability when camped on the 4G cell using the parameters includes the bandListENDC, the plmn-InfoList, the nr-BandList and identifies the maximum throughput available from any of the common EN-DC values/combinations supported by both the UE (100) and the 4G cell based on various cell/signal parameters and operator bandwidth as per deployment, which gives an advantage to correctly identify the 5G availability and estimate maximum throughput for determining whether mobile data needs to be switched or not to the second SIM (150*b*).

Information Elements (IEs) of the SIB-2 includes radio resource configuration information that is common for all UEs, the plmn-InfoList, the upperlayerindication. The plmn-InfoList indicates that the PLMNs supporting the 5G services are available. If E-UTRAN includes this field, which includes the same number of entries, and listed in the same order as PLMNs across the plmn-IdentityList fields included in SIB-1. i.e. the first entry corresponds to the first entry of the combined list that results from concatenating the entries included in the second to the original plmn-IdentityList field. The upperlayerindication provides an indication to upper layers.

The 4G cell broadcasts SIB-2 including the plmn-InfoList-r15 if there is the 5G coverage in the 4G cell area. It indicates that UE (100) can get 5G data service in that area. Operators prefer displaying 5G indicator in the area where the 5G might be available.

The 4G cell SIB-2 includes the plmn-InfoList-r15 IE. The IE of the SIB-26a contains the 5G bands list which can be used for EN-DC operation with the serving cell. The bandListENDC includes a list of 5G bands which can be configured as SCG in the EN-DC operation with the serving cell for forwarding of upperlayerindication to the upper layers. The nr-BandList field indicates a list of bands and is encoded as a bitmap, where the bit N is set to "1" if the current serving cell supports the EN-DC operation with the Nth 5G band in the bandListENDC. The bits which have no corresponding bands in the bandListENDC shall be set to 0, where bit 1 of the bitmap is the leading bit of the bit string. The plmn-InfoList field includes the same number of entries, and listed in the same order as PLMNs across the plmn-IdentityList fields plmn-IdentityList and plmn-IdentityList-r14 included in SIB1. i.e. the first entry corresponds to the first entry of the combined list that results from concatenating the entries included in the second to the original plmn-IdentityList field in SIB1. If the size of the field is set to 0, all bands in bandListENDC apply for all PLMNs listed in SIB1. The 4G cell broadcasts SIB-26a including the bandListENDC which can be configured as SCG in EN-DC operation with serving cell. In also includes the nr-BandList which indicates the list of 5G bands and also the plmn-InfoList which includes the PLMN info supporting the 5G services.

The memory (120) stores instructions to be executed by the processor (130). The memory (120) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the UE (100), a cloud storage, or any other type of external storage.

The processor (130) is configured to execute instructions stored in the memory (120). The processor (130) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130) may include multiple cores to execute the instructions. The communicator (140) is configured for communicating internally between hardware components in the UE (100). Further, the communicator (140) is configured to facilitate the communication between the UE (100) and other devices via one or more networks (e.g. Radio technology). The communicator (140) includes an electronic circuit specific to a standard that enables wired or wireless communication.

In an embodiment, an Artificial Intelligence (AI) based engine could be designed in the UE (100) which could help the UE (100) to determine and prefer cells with better 5G data services during cell selection/reselection/redirection/handover and accordingly set the cellular/network mode including 5G mode and DDS on that particular SIM which is camped on better 5G cell. Also, a database could be maintained either locally or in a master database server which would give recommendation to UE to select certain SIM operator for 5G mode/DDS settings based on previous history of data switching for that operator in that area and accordingly provide better 5G data services to the UE (100) by selecting optimal SIM. The database could be regularly updated and maintained for better accuracy.

Although the FIG. 1 shows the hardware components of the UE (100) but it is to be understood that other embodiments are not limited thereon. In other embodiments, the UE (100) may include less or a greater number of components. Further, the labels or names of the components are used only for illustrative purpose and does not limit the scope of the disclosure. One or more components can be combined together to perform same or substantially similar function for the 5G data session switching.

Figure 2:
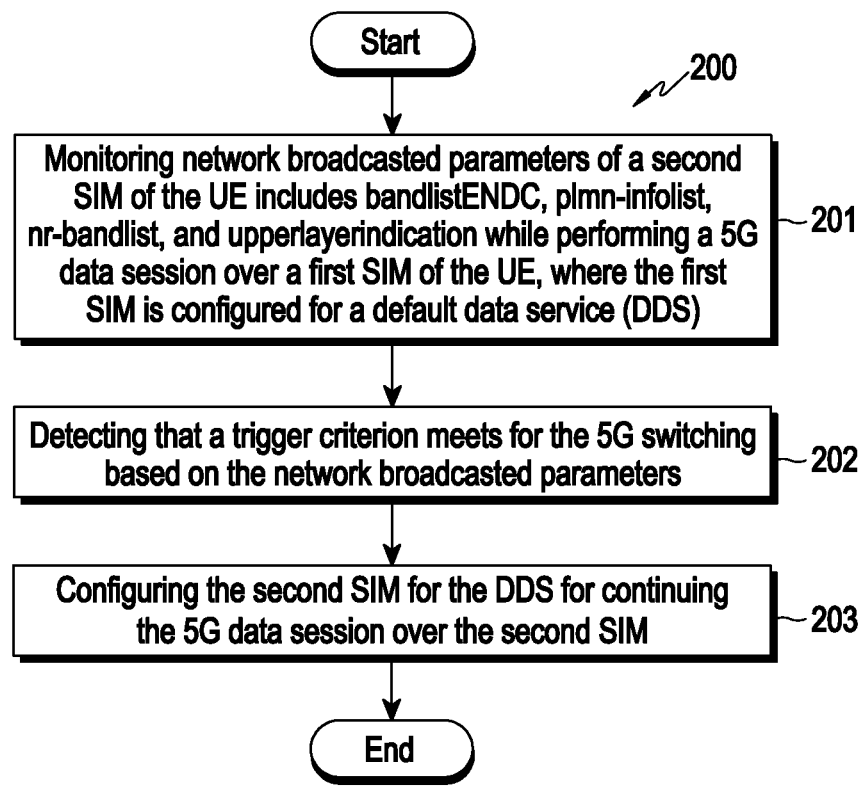
FIG. 2 is a flow diagram illustrating a method for the 5G data session switching by the UE, according to an embodiment of the disclosure.

FIG. 2 is a flow diagram (200) illustrating a method for the 5G data session switching by the UE (100), according to an embodiment of the disclosure.

Referring to FIG. 2, the 5G data session switching engine (110) performs operations 201 to 203 of the flow diagram (200). At operation 201, the method includes monitoring the network broadcasted parameters of the second SIM (150*b*) of the UE (100) includes the bandListENDC, the plmn-InfoList, the nr-BandList, and the upperlayerindication while performing the 5G data session over the first SIM (100*a*) of the UE (100), where the first SIM (100*a*) is configured for the DDS. At operation 202, the method includes detecting that the trigger criterion meets for the 5G data session switching based on the network broadcasted parameters. At operation 203, the method includes configuring the second SIM (150*b*) for the DDS for continuing the 5G data session over the second SIM (150*b*).

In another embodiment, several other parameters can be used to better determine the capability of the SIM to provide 5G data services in that particular area according to upcoming SA architecture and future releases for NSA architecture. In an embodiment, the proposed method could be extended to single SIM scenario as well. In a single SIM 5G device, if the mode is set to any cellular/network mode including 4G mode and not including 5G mode from setting with DDS on, if better 5G data services are available in an area (based on proposed solution), a cellular/network mode change to the cellular/network mode including 5G mode could be triggered based on certain events like high amount of data activity, low latency-based gaming etc. The proposed method could be extended to NR-DC and other Multi-RAT Dual Connectivity (MR-DC) cases.

The various actions, acts, blocks, steps, or the like in the flow diagram (200) may be performed in the order presented, in a different order, or simultaneously. Further, in some embodiments, some of the actions, acts, blocks, steps, or the like may be omitted, added, modified, skipped, or the like without departing from the scope of the disclosure.

Figure 3:
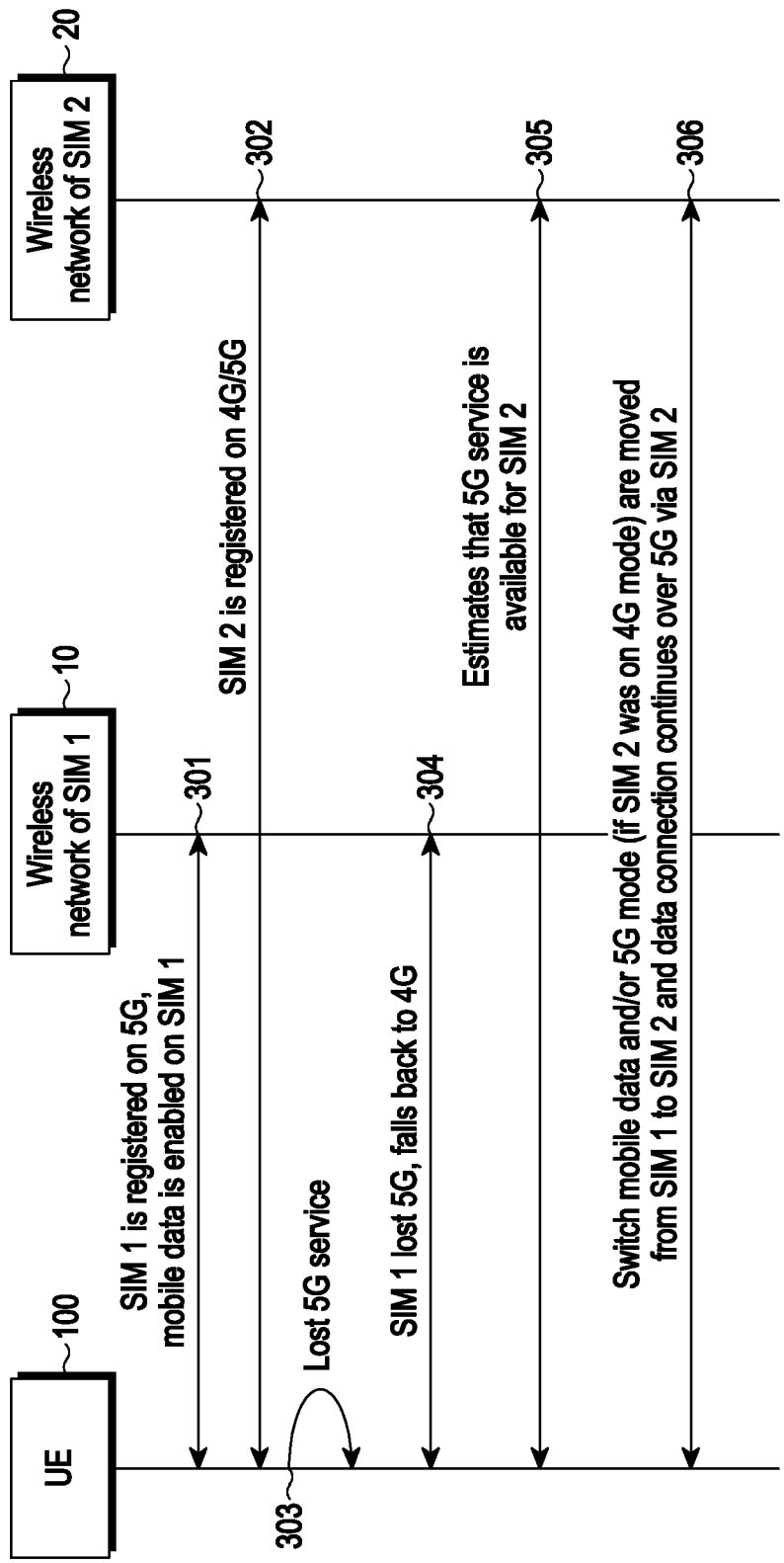
FIG. 3 is a sequential diagram illustrating signaling between the UE and wireless networks for the 5G data session switching when 5G data service is lost on a DDS enabled SIM, according to an embodiment of the disclosure.

FIG. 3 is a sequential diagram illustrating signaling between the UE (100) and the wireless networks (10, 20) for the 5G data session switching when the 5G data service is lost on a DDS enabled SIM, according to an embodiment of the disclosure.

Consider, the first SIM (150a) is the DDS enabled SIM of the UE (100) which is a dual SIM device, where mobile data is set to the first SIM (150a) and data services are continuing on the UE (100) via the first SIM (150a). As soon as the 5G data services are lost on the first SIM (150a) due to the out of 5G service or the SCG failure and if the UE (100) detects that the second SIM (150b) is able to provide the 5G data services based on the network broadcasted parameters that, then the UE (100) dynamically switches the DDS and/or 5G mode (if the second SIM (150b) was on 4G mode) to the second SIM (150b) and the user can further experience 5G data speeds over the second SIM (150b) without any interruption.

In an example, UE's EN-DC capability is given in Table 1.

TABLE 1

| UE's 4G bands | Supported 5G bands of the UE for EN-DC as per UE's capability |
|---|---|
| L1 | N1, N3, N4 |
| L2 | N1, N2 |
| L3 | N/A |
| L4 | N/A |

Consider, the first SIM (150a) is the DDS enabled SIM of the UE (100) and the UE (100) is located in an area with a cell corresponds to the first SIM (150a) has L1 4G band, where the supported 5G bands for the EN-DC as per the bandListENDC and the nr-BandList are N1, N2 and N5. The cell corresponds to the second SIM (150b) has L2 4G band, where the supported 5G bands for the EN-DC as per the bandListENDC and the nr-BandList are N2 and N5. Therefore, L1-N1 are the EN-DC value/combination available for the first SIM (150a) and supported by the UE (100) in the area, whereas L2-N2 are the EN-DC value/combination available for the second SIM (150b) and supported by the UE (100) in the same area. If the 5G data throughput as per operator bandwidth deployment or measurement signal strength, etc. is more for the EN-DC value/combination L2-N2 than the EN-DC value/combination L1-N1, then the UE (100) would get better 5G data service on the second SIM (150b) though DDS is still kept active on the first SIM (150a). The UE (100) switches the DDS to the second SIM (150b) for getting 5G throughput services based on dynamic 5G throughput determined based on UE capability and network broadcasted parameters.

Referring to FIG. 3, at operation 301, the first SIM (150a) is registered on the 5G at the wireless network (10) of the first SIM (150a), where the mobile data is enabled on the first SIM (150a). At operation 302, the second SIM (150b) is registered on the 4G/5G at the wireless network (20) of the second SIM (150b). At operation 303, the UE (100) detects loss of the 5G services. At operation 304, the first SIM (a) falls back to the 4G cell of the wireless network (10) upon detecting loss of the 5G services. At operation 305, the UE (100) estimates that the 5G service is available for the second SIM (150b) using the proposed method. At operation 306, the UE (100) switches the mobile data and/or the 5G mode (if the second SIM (150b) was on the 4G mode) are moved from the first SIM (150a) to the second SIM (150b) and continues the data connection over the 5G cell via the second SIM (150b).

Figure 4:
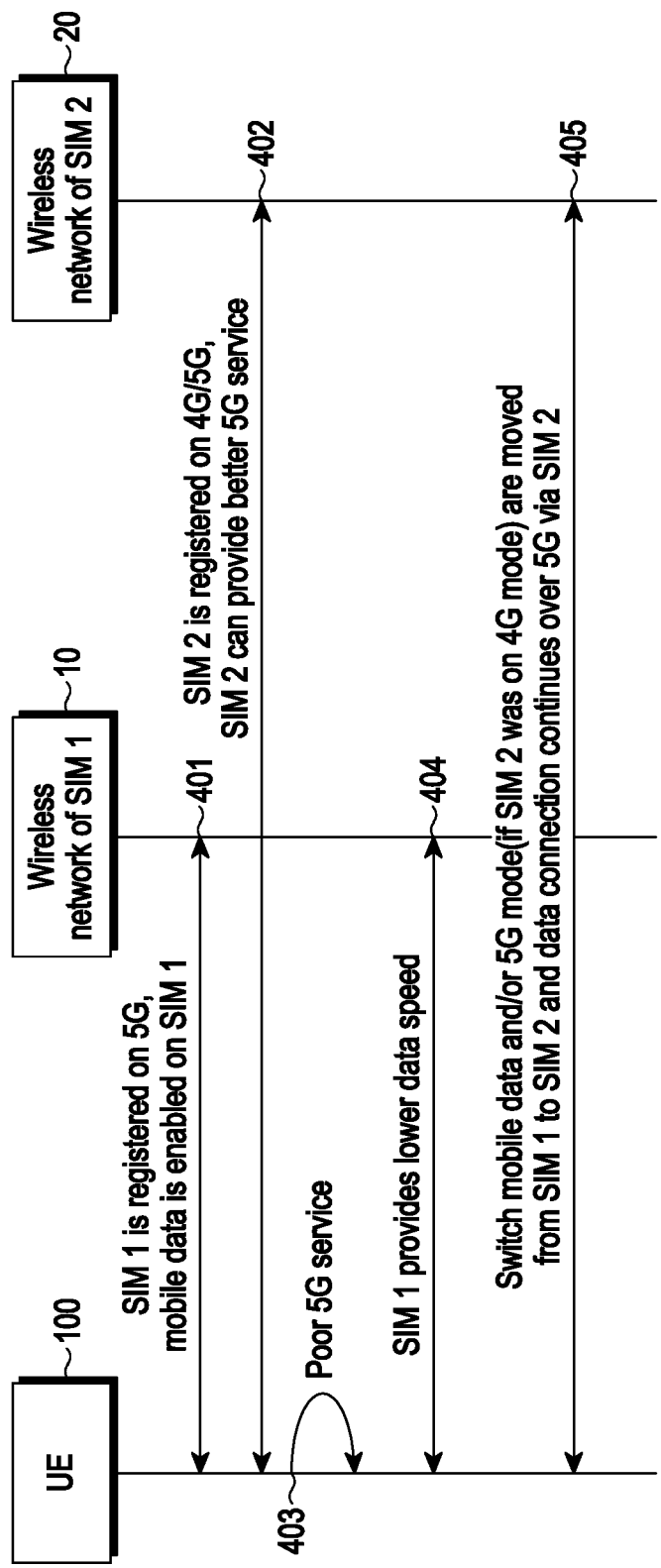
FIG. 4 is a sequential diagram illustrating signaling between the UE and the wireless networks for the 5G data session switching upon experiencing poor 5G data services on the DDS enabled SIM, according to an embodiment of the disclosure.

FIG. 4 is a sequential diagram illustrating signaling between the UE (100) and the wireless networks (10, 20) for the 5G data session switching upon experiencing poor 5G data services on the DDS enabled SIM, according to an embodiment of the disclosure.

Consider, the first SIM (150a) is the DDS enabled SIM of the UE (100) which is the dual SIM device, where mobile data is set to the first SIM (150a) and the UE (100) is present in sub-optimal network conditions for the first SIM (150a). When the UE (100) is getting degraded 5G data services on the first SIM (150a) and if the UE (100) detects that the second SIM (150b) is able to provide better 5G data services based on the network broadcasted parameters, then the UE (100) dynamic switches of the DDS and/or the 5G mode (if the second SIM (150b was on the 4G mode) to the second SIM (150b) and the user can further experience the 5G data speeds over the second SIM (150b).

Referring to FIG. 4, at operation 401, the first SIM (150a) is registered on the 5G at the wireless network (10) of the first SIM (150a), where the mobile data is enabled on the first SIM (150a). At operation 402, the second SIM (150b) is registered on the 4G/5G at the wireless network (20) of the second SIM (150b), the second SIM (150b) can provide better 5G service. At operation 403, the UE (100) detects poor 5G services. At operation 404, the UE (100) detects that the wireless network (10) of the first SIM (150a) provides lower data speed due to presenting a lower coverage area. Further, the UE (100) estimates that the second SIM (150b) can provide better throughput that the throughput given by the first SIM (150a). At operation 405, the UE (100) switches the mobile data and/or the 5G mode (if the second SIM (150b) was on the 4G mode) are moved from the first SIM (150a) to the second SIM (150b) and continues the data connection over the 5G cell via the second SIM (150b).

Figure 5:
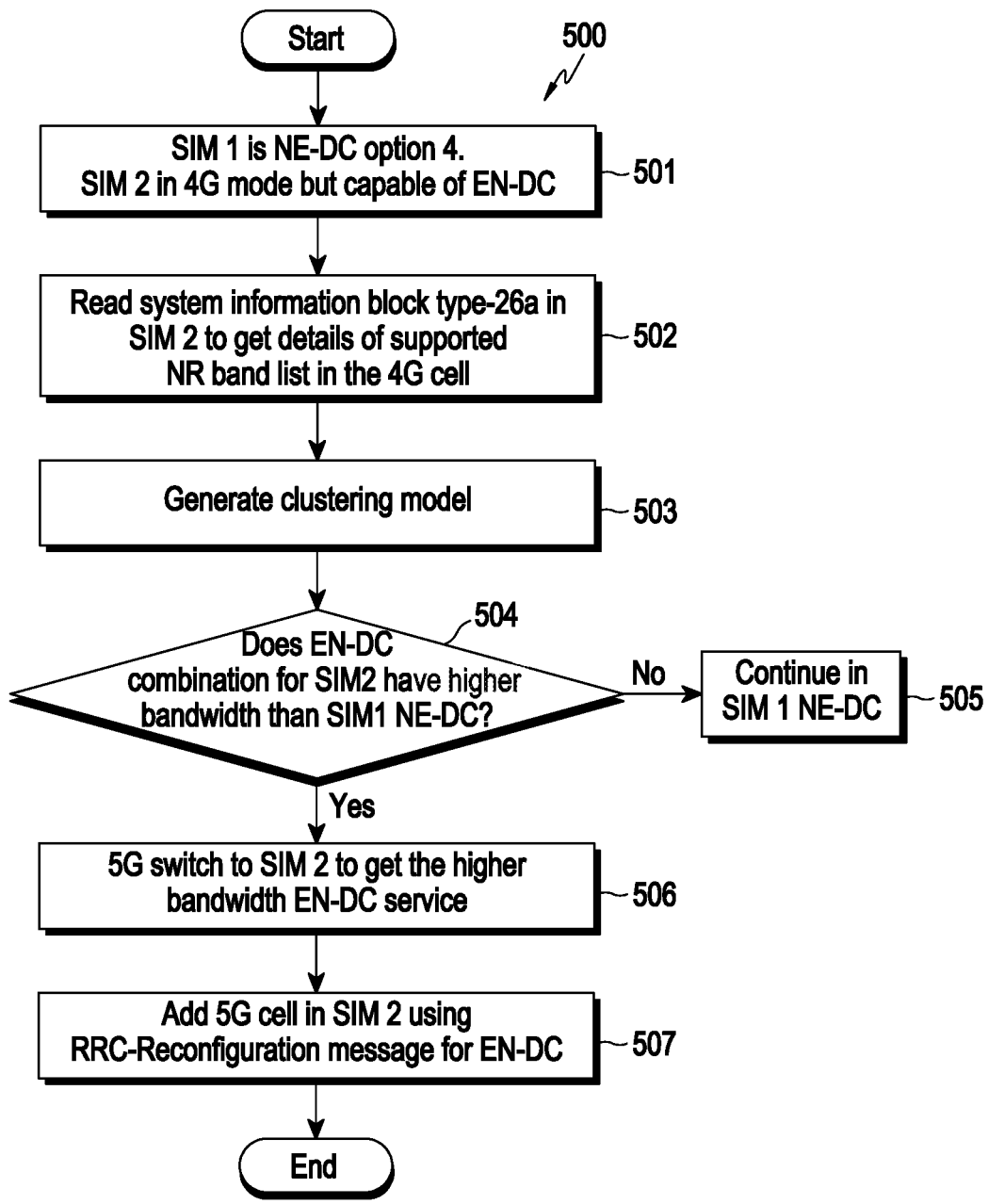
FIG. 5 is a flow diagram illustrating a method for the 5G data session switching upon experiencing poor NE-DC data services on the DDS enabled SIM, according to an embodiment of the disclosure.

FIG. 5 is a flow diagram (500) illustrating a method for the 5G data session switching upon experiencing poor NE-DC data services on the DDS enabled SIM, according to an embodiment of the disclosure.

Consider, the first SIM (150a) is the DDS enabled SIM of the UE (100) which is the dual SIM device, where mobile data is set to the first SIM (150a), where an operator of the first SIM (150a) has deployed architecture option 4 (NE-DC) in the first SIM (150a) in which 5G acts as MCG while 4G acts as SCG. When the UE (100) is getting degraded 5G data services (NE-DC) on the first SIM (150a) and if the UE (100) detects that the second SIM (150b) is able to provide better 5G data services (EN-DC) based on the parameters, then the UE (100) dynamically switches of the DDS and/or the 5G mode (if other SIM was on 4G mode) to the second SIM (150b) and the user can experience 5G data speeds over the second SIM (150b).

Referring to FIG. 5, at operation 501, the operator of the first SIM (150a) has deployed architecture option 4 (NE-DC) in the first SIM (150a) in which 5G acts as MCG while 4G acts as SCG, where the second SIM (150b) is in operating in 4G mode but capable of EN-DC. At operation 502, the UE (100) reads system information block type-26a in the second SIM (150b) to get details of supported NR band list in the 4G cell. At operation 503, the UE (100) generates clustering model. At operation 504, the UE (100) checks whether the EN-DC combination for the second SIM (150b) has higher bandwidth than the bandwidth provided by the NE-DC of the first SIM (150a). If the EN-DC combination for the second SIM (150b) does not provide higher bandwidth, the UE (100) continues in the NE-DC of the first SIM (150*a*) at operation 505. If the EN-DC combination for the second SIM (150*b*) has higher bandwidth, the UE (100) switches the 5G mode to the second SIM (150*b*) to get the higher bandwidth EN-DC service at operation 506. Following the operation 506, the UE (100) adds the 5G cell of the second SIM (150*b*) using Radio Resource Control (RRC) reconfiguration message for the EN-DC at operation 507.

Figure 6:
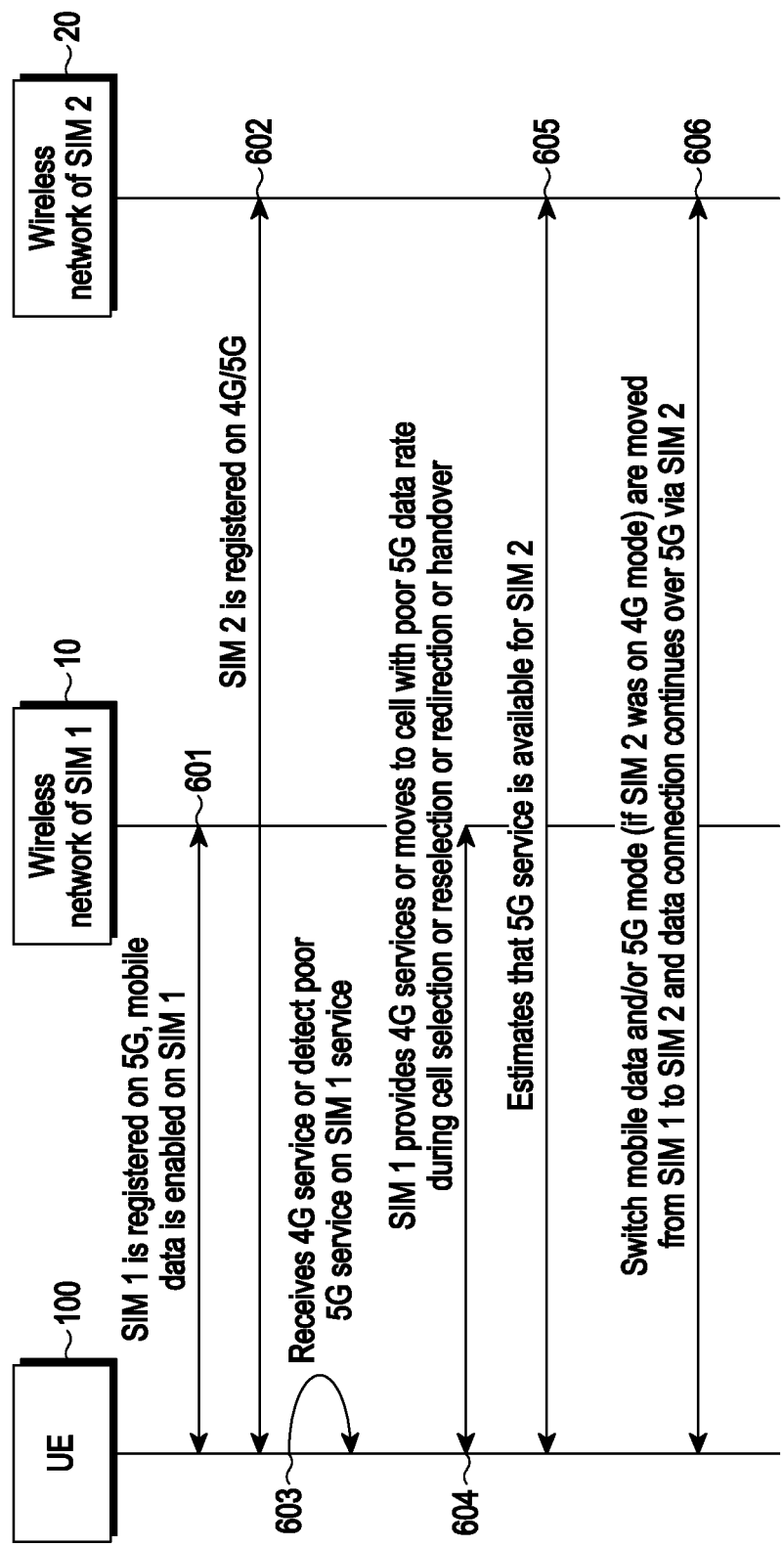
FIG. 6 is a sequential diagram illustrating signaling between the UE and the wireless networks for the 5G data session switching when cell selection/reselection/redirection/handover to a 4G cell or a 5G cell with poor data speeds occurs on the DDS enabled SIM, according to an embodiment of the disclosure.

FIG. 6 is a sequential diagram illustrating signaling between the UE (100) and the wireless networks (10, 20) for the 5G data session switching when cell selection/reselection/redirection/handover to 4G cell or 5G cell with poor data speeds occurs on the DDS enabled SIM, according to an embodiment of the disclosure.

Consider, the first SIM (150*a*) is the DDS enabled SIM of the UE (100) which is the dual SIM device, where the mobile data is set to the first SIM (150*a*). During cell selection/reselection/redirection/handover, the UE (100) might camp on the cell on the first SIM (150*a*) which provides either the 4G services or the 5G data services with comparatively poor data speeds on the first SIM (150*a*) and in the same area. If the UE (100) detects that the second SIM (150*b*) is able to provide better 5G throughput based on the parameters, then the UE (100) dynamically switches of the DDS and/or the 5G mode (if the second SIM (150*b*) was on the 4G mode) to the second SIM (150*b*) and the user can experience 5G data speeds over the second SIM (150*b*).

Referring to FIG. 5, at operation 601, the first SIM (150*a*) is registered on the 5G at the wireless network (10) of the first SIM (150*a*), where the mobile data is enabled on the first SIM (150*a*). At operation 602, the second SIM (150*b*) is registered on the 4G/5G at the wireless network (20) of the second SIM (150*b*). At operation 603, the UE (100) receives the 4G service or detect poor 5G service on the first SIM (150*a*). At operation 604, the first SIM (150*a*) provides the 4G services or moves to cell with poor 5G data rate during cell selection or reselection or redirection or handover. At operation 605, the UE (100) estimates that the 5G service is available for the second SIM (150*b*). At operation 606, the UE (100) switches the mobile data and/or the 5G mode (if the second SIM (150*b*) was on the 4G mode) are moved from the first SIM (150*a*) to the second SIM (150*b*) and continues the data connection over the 5G cell via the second SIM (150*b*).

The embodiments disclosed herein can be implemented using at least one hardware device and performing network management functions to control the elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for performing a data session switching by a User Equipment (UE), the method comprising:
    monitoring network broadcasted parameters of a second Subscriber Identity Module (SIM) of the UE while performing a Fifth Generation Cellular Network (5G) data session over a first SIM of the UE, wherein the first SIM is configured for a Default Data Service (DDS), and the network broadcasted parameters of the second SIM comprise at least one of a bandListENDC, a plmn-InfoList, a nr-BandList, and an upperlayerindication;
    detecting that a trigger criterion is met for the 5G data session switching to the second SIM based on the network broadcasted parameters; and
    in response to the trigger criterion being met, configuring the second SIM for the DDS for continuing the 5G data session over the second SIM.

2. The method of claim 1,
    wherein the UE obtains the network broadcasted parameters from at least one of a System Information Block Type-1 (SIB-1), a System Information Block Type-2 (SIB-2) or a System Information Block Type-26a (SIB-26a).

3. The method of claim 1, wherein the detecting that the trigger criterion is met for the 5G data session switching to the second SIM based on the network broadcasted parameters, comprises:
    identifying a poor network performance of the first SIM;
    estimating that the second SIM is capable of continuing the 5G data session with an optimal network performance based on the network broadcasted parameters; and
    detecting that the trigger criterion for the 5G data session switching is met upon estimating that the second SIM is capable of continuing the 5G data session with the optimal network performance.

4. The method of claim 3, wherein the identifying of the poor network performance of the first SIM, comprises:
    detecting at least one of:
        a Secondary Cell Group (SCG) failure or an out of 5G service on the first SIM, and
        a lower data speed on the first SIM; and
    camping or selecting or reselecting or redirecting or handing-over to a cell on the first SIM that provides poor 5G services or does not provide the 5G services.

5. The method of claim 3, wherein the estimating that the second SIM is capable to continue the 5G data session with the optimal network performance based on the network broadcasted parameters, comprises:
    identifying at least one candidate Evolved-Universal Terrestrial Radio Access (E-UTRA) New Radio (NR) Dual Connectivity (EN-DC) value that is common among EN-DC values broadcasted by a network of the second SIM and EN-DC values supported by the UE on the second SIM based on the network broadcasted parameters;
    estimating a throughput for at least one candidate EN-DC value of the second SIM based on a network deployment parameter, a signal parameter, and a device capability;
    determining that the estimated throughput of the second SIM meets a threshold throughput, wherein the threshold throughput is larger than a throughput for the first SIM; and
    determining that the second SIM is capable of continuing the 5G data session with the optimal network performance upon determining that the estimated throughput of the second SIM meets the threshold throughput.

6. The method of claim 5,
    wherein the network deployment parameter comprises:
        an operator bandwidth and operator deployment of different network architecture options for the second SIM;
        the signal parameter of a cell of the second SIM comprising a Reference Signal Received Power (RSRP);
        a Reference Signal Received Quality (RSRQ);
        a Signal to Interference plus Noise Ratio (SINR); and a Channel Quality Indicator (CQI), and
wherein the device capability comprises:
support of the UE for the second SIM for the EN-DC;
a Carrier Aggregation (CA),
a Multiple Input, Multiple Output (MIMO); and
a number of layers supported for corresponding 4G/5G band.

7. The method of claim 3, wherein the detecting that the trigger criterion for the 5G data session switching meets upon estimating that the second SIM is capable of continuing the 5G data session with the optimal network performance, comprises:
detecting that a fee for data consumption from the second SIM is accepted by a user, a mobile data plan of the second SIM is active, and mobile data for the second SIM is available, upon estimating that the second SIM is capable to continue the 5G data session with the optimal network performance;
receiving a user consent for the 5G data session switching; and
detecting that the trigger criterion for the 5G data session switching is met.

8. The method of claim 1, wherein the configuring of the second SIM for the DDS for continuing the 5G data session over the second SIM, comprises:
determining whether the second SIM is operating in a device cellular mode with 5G mode or an alternative cellular mode upon detecting that the trigger criterion is met;
in response to determining that the second SIM is operating in the alternative cellular mode, switching the second SIM to operate on the device cellular mode with 5G mode, and configuring the second SIM for the DDS for continuing the 5G data session over the second SIM; and
in response to determining that the second SIM is operating in the device cellular mode with 5G mode, configuring the second SIM for the DDS for continuing the 5G data session over the second SIM.

9. The method of claim 1, wherein the configuring of the second SIM for the DDS for continuing the 5G data session over the second SIM, comprises:
initiating a timer upon detecting the trigger criterion is met;
determining whether the trigger criterion is met till an expiry of the timer; and
configuring the second SIM for the DDS for continuing the 5G data session over the second SIM after the expiry of the timer.

10. The method of claim 1, wherein the configuring the second SIM for the DDS for continuing the 5G data session over the second SIM, comprises one of:
automatically configuring the second SIM for the DDS for continuing the 5G data session over the second SIM upon detecting that the trigger criterion is met; and
configuring the second SIM for the DDS for continuing the 5G data session over the second SIM upon detecting the trigger criterion is met based on a user consent.

11. A User Equipment (UE) for performing a Fifth Generation Cellular Network (5G) data session switching, the UE comprising:
memory storing instructions;
at least one processor; and
a first Subscriber Identity Module (SIM),
wherein the instructions, when executed by the at least one processor individually or collectively, cause the UE to:
monitor network broadcasted parameters of a second SIM of the UE while performing a 5G data session over the first SIM of the UE, wherein the first SIM is configured for a Default Data Service (DDS), and the network broadcasted parameters of the second SIM comprise at least one of a bandListENDC, a plmn-InfoList, a nr-BandList, and an upperlayerindication,
detect that a trigger criterion is met for the 5G data session switching to the second SIM based on the network broadcasted parameters, and
in response to the trigger criterion being met, configure the second SIM for the DDS for continuing the 5G data session over the second SIM.

12. The UE of claim 11,
wherein the UE obtains the network broadcasted parameters from at least one of a System Information Block Type-1 (SIB-1), a System Information Block Type-2 (SIB-2) and a System Information Block Type-26a (SIB-26a).

13. The UE of claim 11, wherein the instructions, when executed by the at least one processor individually or collectively, cause the UE to:
identify a poor network performance of the first SIM;
estimate that the second SIM is capable of continuing the 5G data session with an optimal network performance based on the network broadcasted parameters; and
detect that the trigger criterion for the 5G data session switching is met upon estimating that the second SIM is capable of continuing the 5G data session with the optimal network performance.

14. The UE of claim 13, wherein the instructions, when executed by the at least one processor individually or collectively, cause the UE to:
detect at least one of:
a Secondary Cell Group (SCG) failure or an out of 5G service on the first SIM, and
a lower data speed on the first SIM; and
camp or selector reselect or redirect or hand-over to a cell on the first SIM that provides poor 5G services, or does not provide the 5G services.

15. The UE of claim 13, wherein the instructions, when executed by the at least one processor individually or collectively, cause the UE to:
identify at least one candidate Evolved-Universal Terrestrial Radio Access (E-UTRA) New Radio (NR) Dual Connectivity (EN-DC) value that is common among EN-DC values broadcasted by a network of the second SIM and EN-DC values supported by the UE on the second SIM based on the network broadcasted parameters;
estimate a throughput for at least one candidate EN-DC value of the second SIM based on a network deployment parameter, a signal parameter, and a device capability;
determine that the estimated throughput meets a threshold throughput of the second SIM, wherein the threshold throughput is larger than a throughput for the first SIM; and
determine that the second SIM is capable of continuing the 5G data session with the optimal network performance upon determining that the estimated throughput of the second SIM meets the threshold throughput.

16. The UE of claim 15,
wherein the network deployment parameter comprises:

an operator bandwidth and operator deployment of different network architecture options for the second SIM, the signal parameter of a cell of the second SIM comprising a Reference Signal Received Power (RSRP), a Reference Signal Received Quality (RSRQ), a Signal to Interference plus Noise Ratio (SINR), and a Channel Quality Indicator (CQI), and wherein the device capability comprises:

support of the UE for the second SIM for the EN-DC, a Carrier Aggregation (CA), a Multiple Input, Multiple Output (MIMO), and a number of layers supported for corresponding 4G/5G band.

17. The UE of claim 13, wherein the instructions, when executed by the at least one processor individually or collectively, cause the UE to:

detect that a fee for data consumption from the second SIM is accepted by a user, a mobile data plan of the second SIM is active, and mobile data for the second SIM is available, upon estimating that the second SIM is capable to continue the 5G data session with the optimal network performance;

receive a user consent for the 5G data session switching; and detect that the trigger criterion for the 5G data session switching is met.

18. The UE of claim 11, wherein the instructions, when executed by the at least one processor individually or collectively, cause the UE to:

determine whether the second SIM is operating in a device cellular mode with 5G mode or an alternative cellular mode upon detecting that the trigger criterion is met; and in response to the determination that the second SIM is operating in the alternative cellular mode, switch the second SIM to operate on the device cellular mode with 5G mode, and configure the second SIM for the DDS for continuing the 5G data session over the second SIM; and in response to the determination that the second SIM is operating in the device cellular mode with 5G mode, configure the second SIM for the DDS for continuing the 5G data session over the second SIM.

19. The UE of claim 11, wherein the instructions, when executed by the at least one processor individually or collectively, cause the UE to:

initiate a timer upon detecting that the trigger criterion is met;

determine whether the trigger criterion meets till an expiry of the timer; and configure the second SIM for the DDS for continuing the 5G data session over the second SIM after the expiry of the timer.

20. The UE of claim 11, wherein the instructions, when executed by the at least one processor individually or collectively, cause the UE to:

automatically configure the second SIM for the DDS for continuing the 5G data session over the second SIM upon detecting that the trigger criterion is met; or configure the second SIM for the DDS for continuing the 5G data session over the second SIM upon detecting the trigger criterion is met based on a user consent.

* * * * *